United States Patent [19]
De Shazor

[11] 3,748,933
[45] July 31, 1973

[54] PIPE CUTTING AND FORMING TOOL

[76] Inventor: James C. De Shazor, 3314 Coy Dr., Sherman Oaks, Calif. 91403

[22] Filed: Feb. 24, 1972

[21] Appl. No.: 229,112

[52] U.S. Cl. .............................. 82/4 C, 82/70.2 R
[51] Int. Cl. .......................... B23b 3/22, B23b 3/04
[58] Field of Search .......................... 82/4 C, 70.2 R

[56] References Cited
UNITED STATES PATENTS

| | | | |
|---|---|---|---|
| 3,630,109 | 12/1971 | MacMichart | 82/4 C |
| 3,540,329 | 11/1970 | Gill | 82/4 C |
| 3,540,328 | 11/1970 | Foss | 82/4 C |
| 3,421,492 | 1/1969 | Brown | 82/4 C |
| 3,222,961 | 12/1965 | Broadhead et al. | 82/70.2 R |
| 3,088,352 | 5/1963 | Tanner | 82/4 C X |
| 2,900,858 | 8/1959 | Gauthier et al. | 82/4 C |
| 1,029,584 | 6/1912 | Berghausen | 82/4 C |

Primary Examiner—Harrison L. Hinson
Attorney—William H. Dean

[57] ABSTRACT

A pipe cutting and forming tool particularly adapted for manual use in cutting and forming the ends of plastic pipe to receive seals and coupling structures for coupling plastic pipe to connectors or fittings and for sealing the pipe relative to such connectors or fittings; the tool comprising a frame carrying a pipe holder which engages the interior of a pipe and a pipe collar which engages the exterior of a pipe, both of which are mounted on the frame so as to allow rotation of the frame concentrically relative to the holder and the collar when fixed to the pipe; and a cutter and forming tool adjustably mounted on the frame to move radially inward and outward relative to an end of the pipe when held by the pipe holder and collar so that shoulders and seal engaging portions as well as grooves may be formed on the exterior of the pipe at the end for holding seals as well as locking means for sealing and locking a piece of pipe relative to a coupling or fitting.

17 Claims, 9 Drawing Figures

PIPE CUTTING AND FORMING TOOL

BACKGROUND OF THE INVENTION

In the production and assembly of plastic pipe and couplings many operations may be performed on the ends of pipe and relative to couplings and such operations may be performed at a factory area; however, there are some cutoff and forming operations which must be performed in the field in order that pipes may be made in various custom lengths and must be machined at the ends thereof to receive seals as well as locking structures for holding the pipe properly sealed and locked relative to a coupling or fitting.

The plumbing art has always imposed the custom cutting of pipe to various lengths in order to fit into various assemblies which are dictated by environmental conditions. These environmental conditions are imposed by mechanical features of buildings or terrain or other fixed objects around which and between or within which plumbing must be installed.

Accordingly, there has been a need for a plastic pipe cutting and forming tool adapted to finish form and cut end portions of a pipe precisely to receive seals as well as locking devices, and in particular it has been a problem to provide such a tool which will form sealing and locking features on a pipe in the field and perform such operations precisely enough to afford proper sealing surfaces as well as interlocking grooves or ledges as the case may be.

SUMMARY OF THE INVENTION

The present invention comprises a frame which carries a collar having a bore portion adjustably adapted slidingly to fit over and be fixed to the exterior of a pipe and the frame also carries an expandable holder plug adapted to grip the interior of the pipe in concentric relation to said collar, the holder and collar being rotatable relative to the frame so that the frame may be rotated relative to the pipe and relative to the collar and holder. The frame carries a cutter and forming tool adapted to be manually adjusted radially inward and outward at substantially right angles to the central axis of the collar and the holding plug so as to perform external machine operations on end portions of pipe for the purpose of providing areas for disposition of seals as well as for engagement with locking means for locking pipe internally in couplings as well as various pipe fittings.

The invention includes a novel cutter and forming tool adapted to provide a frusto-conical chamfer on the end of a pipe as well as a reduced diameter portion having a transition shoulder and further, the same cutting and forming tool is adapted to concurrently form a peripheral groove in a pipe so that the frusto-conical chamfer as well as the reduced diameter seal may accommodate a seal while the external groove is adapted to provide for the holding of the locking means which interlocks the pipe with a coupling or fitting as desired.

The tool of the invention is also adapted such that pipe surrounding collars and expanding holding plugs may be varied in diameter to accommodate various pipes having various outside diameters and various wall thicknesses, the said collars and plugs being readily exchangeable relative to the frame of the tool so that the tool may quickly be changed to accommodate various diameters of pipe as well as wall thicknesses thereof.

Accordingly it is an object of the invention to provide a very versatile, simple and accurate manually operable tool for cutting and forming peripheral portions of a piece of pipe at the end thereof for receiving seals as well as locking devices.

Another object of the invention is to provide a novel combination of a frame; a collar having a bore therein adapted to slidingly engage and be fixed to the periphery of a pipe; an internally expanding plug rotatable relative to said frame and restrained in a direction axially relative to said plug so that the frame as well as the cutter may be rotated around the pipe as well as the plug and collar for precisely performing cutting and machining operations on the periphery of the pipe while it is held in a conventional pipe vise or the like.

Another object of the invention is to provide a pipe cutting and forming tool which is particularly adapted for use by plumbers for manual cutting and forming of the ends of pipe in the field so that pipe may be made in custom lengths precisely to seal and lock into couplings or other pipe fittings.

Another object of the invention is to provide a pipe cutting and forming tool particularly adapted for use in connection with plastic pipe and which is very rapidly and easily operable for cutting and forming end portions on pipe during the custom fitting of such pipe in the field.

Another object of the invention is to provide a manually operable tool for cutting and forming end portions of plastic pipe which is extremely accurate and which may simply be rotated around the central axis of a piece of pipe and which performs with sufficient accuracy to form a very efficient sealing surface at the end portions of pieces of plastic pipe.

Further objects and advantages of the invention may be apparent from the following specifications, appended claims and accompanying drawings.

DESCRIPTION OF THE PREFERRED EMBODIMENTS

Figure 1:
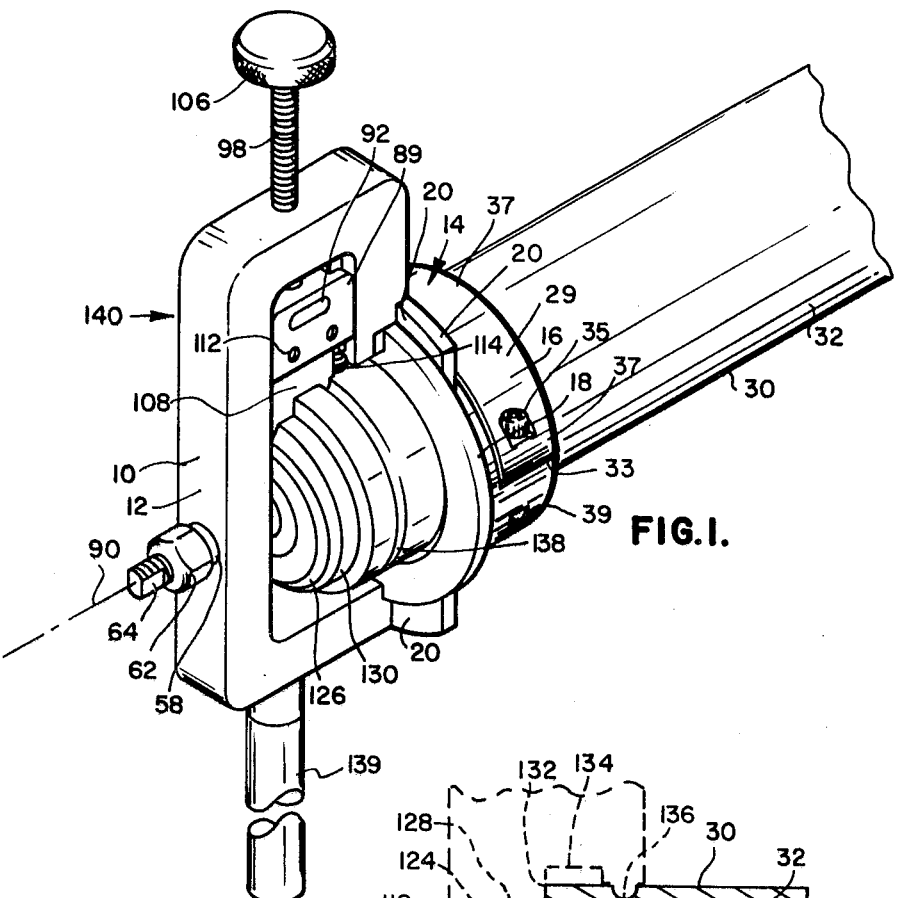
FIG. 1 is a fragmentary perspective view of a pipe cutting and forming tool of the invention shown in position and in operation relative to a piece of pipe being formed and cut by the tool.

As shown in FIG. 1 of the drawings, the tool of the invention includes a substantially C-shaped frame 10 having a closed side 12 and an open side 14.

Figures 4, 5:
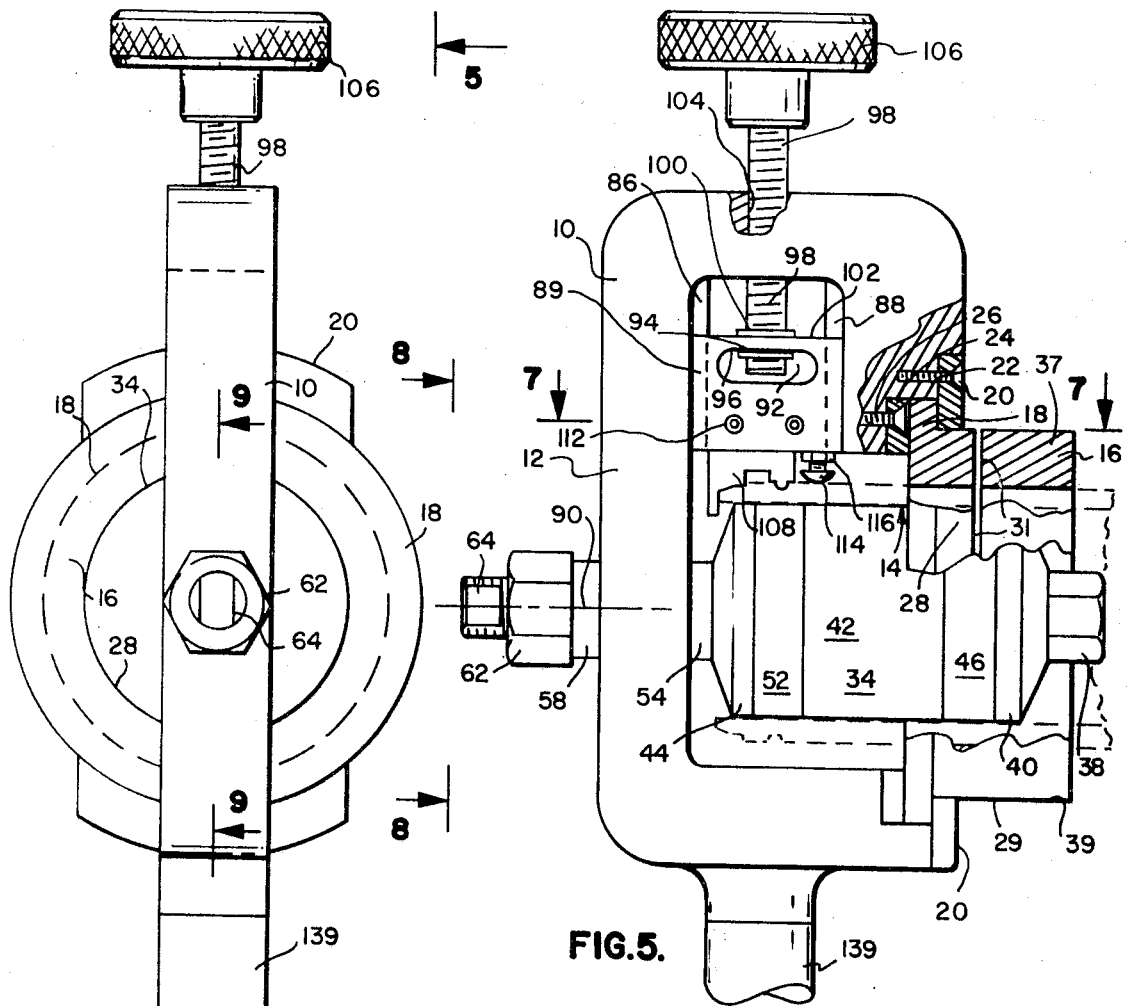
FIG. 4 is an enlarged fragmentary end view of the tool of the invention.
FIG. 5 is a fragmentary side elevational view taken from the line 5—5 of FIG. 4 showing the tool of the invention.

Fixed to the open side 14, as shown in FIGS. 1 and 5, is a collar 16. This collar 16 is a hollow tubular collar having a radially and outwardly extending flange 18. This flange 18 is slidingly engaged at one side by flange bearing plates 20 secured to the open side of the frame 10 by means of screws 22. The opposite side of the flange 18 bears upon bearing plates 24 which are held on the frame 10 by means of screws 26. Accordingly, the flange 18 is rotatably slidable between the plates 20 and 24.

The bearing plates 20, as shown in FIG. 1, extend arcuately around the periphery 29 of the collar 16 for holding the collar concentrically rotatable relative to the frame 10.

Figure 7:
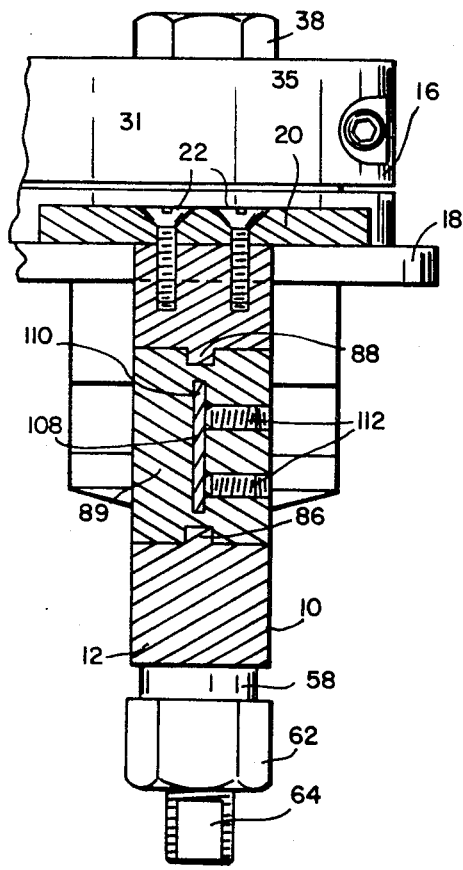
FIG. 7 is an enlarged fragmentary sectional view taken from the line 7—7 of FIG. 5.
Figure 9:
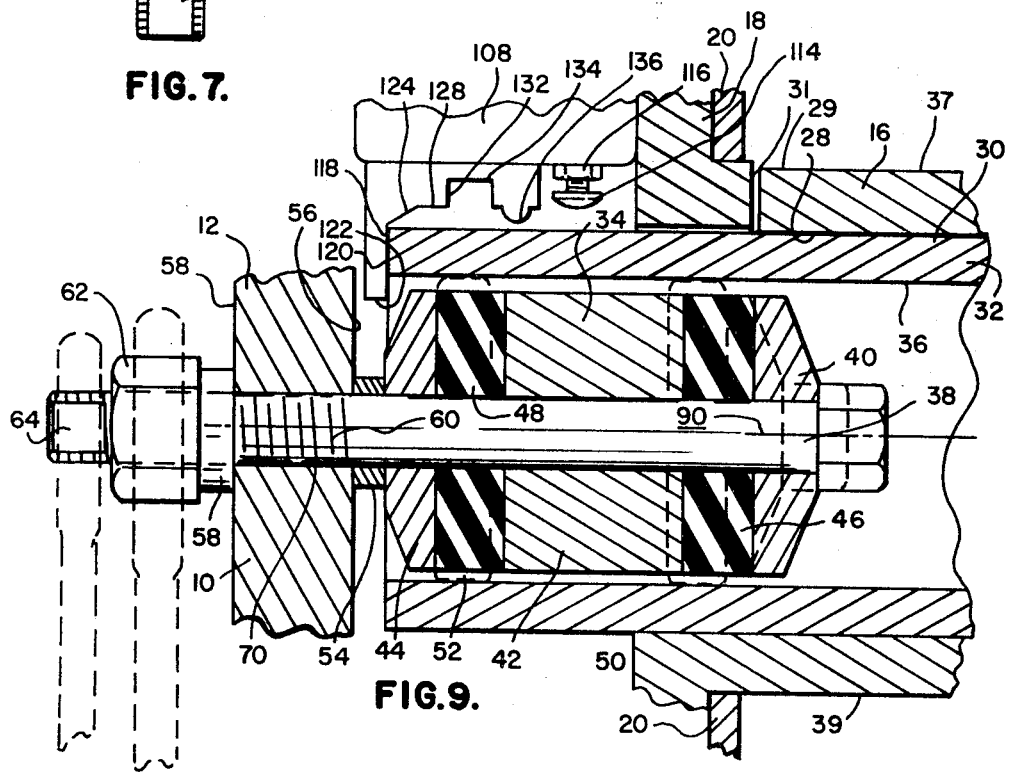
FIG. 9 is an enlarged fragmentary sectional view taken from the line 9—9 of FIG. 4 showing by broken lines wrenches for adjusting the expandable pipe holding plug of the invention and showing varying positions of the plug in normal position and in radially expanded position relative to the bore of pipe held in the pipe holding collar of the invention.

The collar 16, as shown in FIGS. 1, 7 and 9, is split circumferentially almost 180° by means of a slot 31. The collar is also split a short distance by means of an axially directed slot 33 as shown in FIG. 1. A clamp belt 35 is screw threaded into the collar 16 at one side of the slot 33 and a head of the clamp bolt engages the collar at the opposite side of the slot 33 to clamp a segment 37 of the collar toward the remaining portion 39 of the collar for fixedly clamping the collar diametrically to fixedly clamp and grip the periphery of a pipe to be machined by the cutter tool of the invention.

Figure 2:
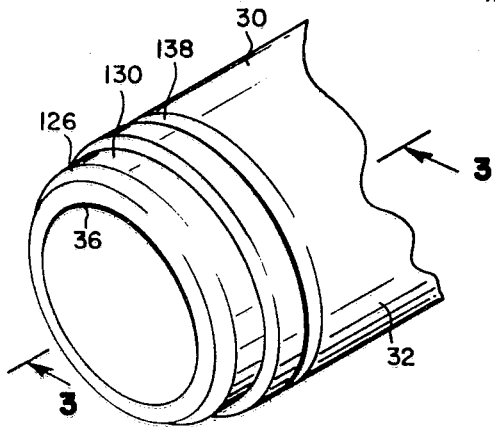
FIG. 2 is a perspective view of an end of a piece of pipe which has been cut and formed by the tool of the invention.
Figure 3:
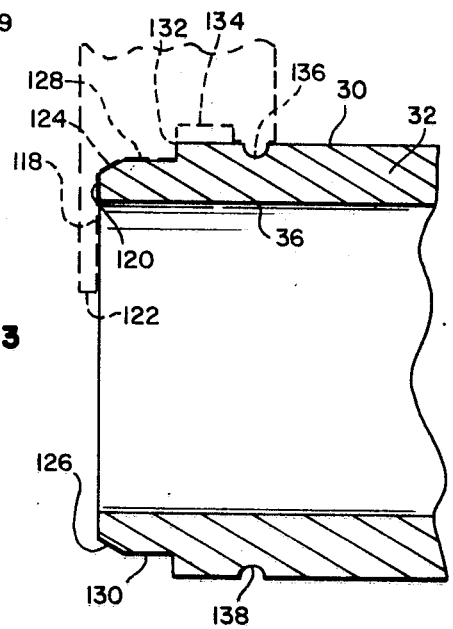
FIG. 3 is an enlarged fragmentary sectional view taken from the line 3—3 of FIG. 2 showing a longitudinal section of the cut and formed pipe disclosed in FIG. 2.

In this manner, the collar 16 is rotatably mounted at the open side 14 of the frame 10 and the collar 16 is provided with an internal bore 28 which is adapted slidably to fit over the periphery 30 of a piece of pipe 32 as shown in FIGS. 1, 2 and 3 of the drawings.

The bore of the collar 16 may vary in diameter in order to accommodate the pipe 32 when the diameter thereof is varied, as for example, the collar 16 may be quite thick for small pipe and relatively thin for larger pipe, as desired. Thus, the collar 16 may quickly be changed so that a larger or smaller bore collar may be secured to the frame 10 simply by removing the screws 22 and the plates 20 as desired.

An expandable pipe plug assembly 34, as shown in FIGS. 5 and 9 of the drawings, is provided to engage an internal bore 36 of the pipe 32 while the periphery 30 of said pipe is held in the bore 28 of the collar 16. The plug assembly 34 constitutes a pipe holder and this pipe holder is an expandable holder provided with a clamping center bolt 38 which extends through three disc shaped relatively rigid parts 40, 42 and 44. The bolt 38 also extends through expandable rubber-like parts 46 and 48. These parts are provided with generally circular peripheral portions 50 and 52, respectively, adapted to be expanded into snug fitted relationship with the bore 36 of the pipe 32.

Surrounding the bolt 38 is a bearing 54 which bears against an inner side 56 of the closed side portion 12 of the frame 10 and bearing against an outer side 58 of said closed portion 12 is another bearing 58. These bearings 54 and 58 may be oilite or other low coefficient of friction bearings so that the frame 10 may be rotated relative to the bolt 38, as will be hereinafter described, when the expandable rubber-like washers 46 and 48 are frictionally expanded into gripping relation with the bore 36 of the pipe 32 and when the pipe 32 is held in a conventional pipe vise or the like.

Screw threadably mounted on an externally screw threaded portion 60 of the bolt 38 is a screw threaded nut 62. Adjacent this nut 62 are flats 64 on the bolt 38, all as shown best in FIGS. 8 and 9 of the drawings.

The flats 64 may be engaged by a wrench 66 while another wrench 68 engages the hexagonal surfaces of the nut 62 so that the draw bolt 38 may be rotationally restrained while the nut 62 is advanced on the screw threaded portion 60 for forcing the rigid plates 40 and 44 together to compress the rubber-like compressible discs 50 and 52 against opposite sides of the disc 34 for radially expanding the expandable rubber-like discs 50 and 52 into snug engagement concentrically within the bore 36 of the pipe 32 and thus the pipe 32, when engaged in the bore 28 of the collar 16, is snugly fitted therein such as to be precisely located in the frame 10 and the bearings 54 and 58 restrain the plug assembly 34 in juxtaposition longitudinally relative to the central axis of the bolt 38 as well as the central axis of the pipe 32 and the bore 28 of the collar 16.

It will be appreciated that when the pipe 32 is held in a conventional vise, the frame 10 may be rotated about the collar and the pipe 32 as well as the plug assembly 34 of the pipe holder.

It will be seen that the draw bolt 38 as shown in FIG. 9 of the drawings extends through an opening 70 in the closed side 12 of the frame 10 and that the bolt 38 is freely rotatably mounted in this opening 70.

Figure 6:
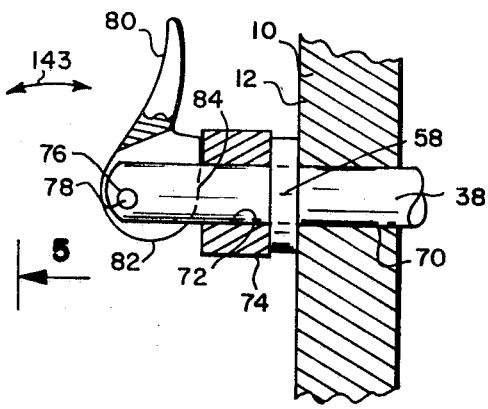
FIG. 6 is a fragmentary view showing a modified pipe holding plug adjusting means of the invention.

In the modification as shown in FIG. 6 of the drawings, the bolt 38 extends through the opening 70 and through the bearing washer 58 and also extends through a smooth bore 72 of a nut 74. The bolt 38 is provided with an opening 76 through which a toggle holding pin 78 extends. A toggle handle 80 is mounted pivotally on the pin 78 and is provided with a generally spiral shaped cam surface 82 adapted to exert force at 84 on one side of the smooth bore nut 74. The spiral cam surface 82 is thus capable of withdrawing or releasing the bolt 38 longitudinally through the opening 70 for either compressibly expanding the resilient rubber-like washers 50 and 52 or for relaxing them in a similar manner to the operation of the nut 62 hereinbefore described. It will be understood, however, that the toggle handle 80 may be very rapidly operated and may be useful in connection with the tool of the invention in accordance with the application thereof to various operations as desired.

As shown in FIGS. 5 and 7 of the drawings, the frame 10 is provided with slide ways 86 and 88 which are substantially parallel to each other and spaced apart. These ways 86 and 88 are ridge shaped ways as shown in FIG. 7 of the drawings and extend at an angle to and substantially radially with relation to a central axis 90 which passes through the center of the draw bolt 38 as well as the bore 36 of the pipe 32 and the bore 28 of the collar 16.

A tool holder 90 comprises a slide which is longitudinally slidably mounted on the ways 86 and 88 and this tool holder 90 is provided with an opening 92 forming an end play bearing surface 94 engageable by a snap ring 96 fixed on the periphery of an adjusting screw member 98. Another snap ring 100 engages the screw 98 and is fixed thereon and this snap ring 100 rotatably bears on a surface 102 of the slide 90. The screw threaded member 98 is screw threaded in an internally screw threaded bore 104 in the frame 10 and this internally screw threaded bore 104 is directed radially outwardly from the axis 90 as shown in FIG. 5 of the drawings.

Secured to the screw 98 is a manually engageable knob 106 adapted for rotation of the screw 98 and for adjusting the tool holder slide 90 inward and outward relative to the axis 90 as will be hereinafter described.

As shown in FIGS. 5 and 7 of the drawings, the tool holder slide 90 carries a cutter and forming tool 108. This tool 108 is slidably disposed in a slot 110 in the tool holder and carrier 90 and is fixed therein by such screws 112 shown best in FIG. 7 of the drawings.

Screw threadably mounted in the tool holder slide 90 is a stop screw 114 adapted to engage the periphery 30 of the pipe 32 as will be hereinafter described in detail.

The stop screw 114 is provided with a set nut 116 to allow for adjustment of the end of the screw 114 to engage the periphery of pipe in order to predetermine the depth at which the cutting tool 108 may be set as will be hereinafter described in detail.

The cutter tool 108, as shown in FIG. 5 of the drawings, is shown in more detail in FIGS. 9 of the drawings and on enlarged scale. Accordingly, reference is made to FIG. 9 of the drawings.

The cutter tool 108 is provided with a stop portion 118 adapted to engage an end portion 120 of the pipe 32 and the tool 108 adjacent the stop portion 118 is provided with a cutoff cutter edge 122 adapted to cut off and finish the end 120 of the pipe 32.

A cutter portion 124 adjacent the stop 118 is disposed at an angle to the axis 90 of the plug assembly 34 and the angular cutter edge 124 is adapted to form a frusto-conical end portion 126 on the pipe 32 as shown best in FIG. 3 of the drawings. Another cutter edge portion 128 is provided on the cutter tool 108 and this cutter portion 128 is substantially parallel with the axis 90 and is adapted to machine a reduced diameter portion 130 on the pipe 32 as shown in FIG. 3 of the drawings.

A transition edge portion 132 is disposed adjacent the cutter edge 128 and extends radially outward therefrom to a relief notch portion 134 which is adapted to clear the periphery of the pipe 32 as shown in FIG. 3 when the reduced diameter portion 130 is completely formed.

Adjacent to the notched relief portion 134 is an inwardly directed generally arcuate cutter edge portion 136 adapted to form a semicircular in cross section groove 138 in the periphery of the pipe 32, this groove being adapted to receive a locking seal not shown in the present application.

The frame 10 is provided with a radially directed handle 138 adapted for manually rotating the frame 10 about the axis 90 when the pipe is held stationarily, and by the holder 34 and collar 16 as shown in FIG. 9. The cutter tool 108 is advanced inwardly by means of the screw 98 and the manually operable knob 106 connected therewith for moving the cutter portions of the cutter tool 108 inwardly against the periphery of the pipe 32 so that it is progressively formed, as shown in FIG. 3, and as hereinbefore described. It will be noted that the frame 10 is progressively rotated around the axis 90 in a direction as indicated by an arrow 140 in FIG. 1 of the drawings and the screw 98 is progressively advanced by the knob 106 inwardly against the pipe until the head portion of the stop screw 114 engages the periphery 30 of the pipe 32 at which point the pressure on the screw 98 will be felt by the operator and accordingly the inward movement of the cutter 108 will be restrained so that the reduced diameter portion 130, as well as the frustoconical portion 126 and the groove 138, will be formed to a set of precise predetermined diameters.

Accordingly, the end of the pipe is cut and formed to receive a seal at the frusto-conical portion 126 and reduced diameter portion 130 and to receive a locking member 138 at the groove 138 all as hereinbefore described.

When the tool of the invention is used in the field, the pipe 32 is inserted through the bore 28 of the collar 16 to the stop 118 of the cutter tool 108, and the collar 16 is diametrically tightened by the bolt 35, and the plug assembly 34 is tightened by the bolt 38 to expand the expandable washers 46 and 48 at their peripheries 50 and 52, respectively, to grip the bore 36 of the pipe 32 and to hold it precisely in the bore 28 of the collar 16. The bearing washers 54 and 58 hold the plug assembly 34 in axial juxtaposition for holding the end 120 of the pipe 32 in axial juxtaposition while the cutter 108, as hereinbefore described, precisely machines the end portion of the pipe as the frame 10 is rotated around the pipe 32 while it is held in a pipe vise or the like. It will be understood that the opening 70 in the closed end 12 of the frame 10 rotates about the bolt 38 since it is frictionally held in the pipe 32 by means of the expanded rubber-like washers 46 and 48 and the bearing plates 20, carried by the frame, slidably rotate around the periphery of the collar 16.

Figure 8:
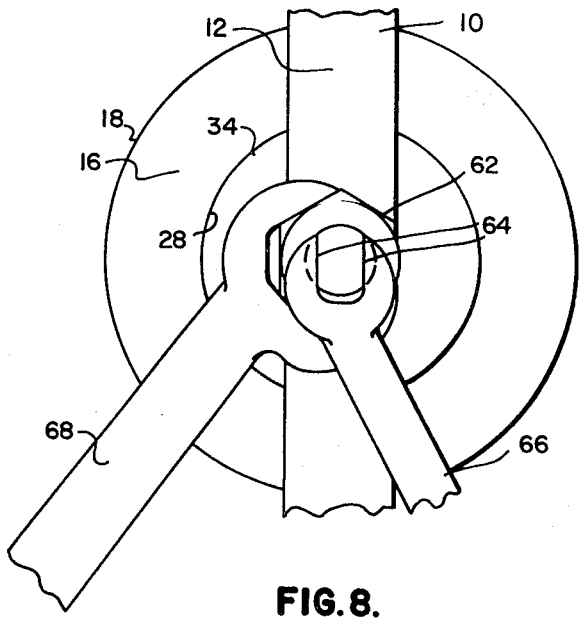
FIG. 8 is an enlarged fragmentary elevational view taken from the line 8—8 of FIG. 5 and showing the disposition of a pair of wrenches for adjusting the expanding pipe holding plug of the invention.

When the nut 52 is used, the wrenches as shown in FIG. 8, may be used to tighten or loosen the expandable washers 46 and 48 in the bore 36 of the pipe, and when the toggle mechanism as shown in FIG. 6 is utilized, the handle 80 thereof may be moved backward and forward in the directions of an arrow 143 in FIG. 6 of the drawings for tightening or loosening the bolt 38. When the handle 80 is moved away from the frame 10, the bolt 38 is released to relax the resilient washers 46 and 48, and when the handle 80 is moved toward the frame 10, the bolt 38 is retracted and the washers 46 and 48 are expanded into engagement with the bore 36 of the pipe 32.

It will be obvious to those skilled in the art that various modifications may be resorted to without departing from the spirit of the invention.

I claim:

1. A pipe cutting and forming tool comprising: a frame; a collar on said frame; said collar having first and second opposite ends; said collar having a bore provided with a central axis; said bore adapted slidingly to fit over the periphery of a hollow tubular pipe; said frame having a tool slide; elongated ways on said frame; said ways disposed longitudinally at substantially right angles to said axis of said bore; said slide movably mounted on said ways; means for moving said slide in directions toward and away from said axis; a forming and cutting tool carried by said slide and adapted to cut and form peripheral portions of a pipe held in said bore; said slide being disposed beyond said first end of said collar; a pipe holder rotatably mounted on said frame and rotatable about an axis concentric with said central axis; said pipe holder provided with an expandable plug means adapted to fit in the bore of a pipe when said pipe is disposed in said bore of said collar; said pipe holder being restrained in said frame in directions longitudinally relative to said central axis; said holder rotatable about said central axis relative to said frame; whereby said pipe is held precisely in longitudinal juxtaposition in said frame and relative to said forming and cutter tool when said frame and said cutter tool are rotated around said central axis relative to said pipe holder and said pipe.

2. The invention as defined in claim 1, wherein: said collar and said pipe holder are readily removably mounted on said frame and being readily exchangeable to accommodate pipe of various diameters and thicknesses.

3. The invention as defined in claim 1, wherein: said pipe holder comprises a compressible rubber-like means adapted to fit into the bore of a pipe; relatively rigid members at opposite ends of said rubber-like means; and draw bolt means extending through said rubber-like means and said rigid members for forcing said rigid members together and compressing said rubber-like means into a diametrically enlarged form and to thereby compressibly engage in the bore of a pipe and to thereby hold said pipe.

4. The invention as defined in claim 3, wherein: said draw bolt means comprises screw threaded means for forcing said rigid members together.

5. The invention as defined in claim 3, wherein: said draw bolt means comprises a cam and lever means for forcing said rigid members together.

6. The invention as defined in claim 1, wherein: said cutter tool is provided with stop means disposed to locate a finished end of said pipe when disposed in said collar and held by said holder.

7. A pipe cutting and forming tool comprising a generally C-shaped frame having a closed side and a relatively open side; a collar removably mounted on said open side of said frame; said collar having first and second opposite open ends; said collar having a bore provided with a central axis; said bore adapted to slidingly fit over the periphery of a hollow tubular pipe; said frame having a tool slide; elongated ways on said frame, said ways disposed longitudinally at substantially right angles to said axis of said bore; said slide movably mounted on said ways; means for moving said slide in directions toward and away from said axis; a forming and cutter tool carried by said slide and adapted to cut and form peripheral portions of a pipe held in said bore; said slide being disposed beyond said first end of said collar; a pipe holder rotatably mounted on said closed side of said frame and rotatable about an axis concentric with said central axis; said pipe holder provided with an expandable plug adapted to fit in the bore of a pipe when said pipe is disposed in said bore of said collar; said pipe holder being restrained in said frame in directions longitudinally relative to said central axis, whereby said pipe is held precisely in longitudinal juxtaposition in said frame and relative to said forming and cutter tool when said frame and said cutter tool are rotated around said central axis relative to said pipe holder and said pipe.

8. The invention as defined in claim 3, wherein: said cutter tool is provided with means disposed to locate a finished end of a pipe when disposed in said collar and held by said holder.

9. The invention as defined in claim 6, wherein: said cutter tool is provided with a cutoff means disposed to locate a finished end of a pipe when disposed in said collar and held by said holder.

10. The invention as defined in claim 7, wherein: said pipe holder is rotatably mounted in said closed side of said frame and said collar is carried by said open side of said frame.

11. The invention as defined in claim 1, wherein: a screw threaded manually operable means is provided for moving said slide along said ways.

12. The invention as defined in claim 1, wherein: said frame is provided with a handle projecting outward therefrom in a generally radial direction relative to said central axis.

13. The invention as defined in claim 1, wherein: said cutter tool is provided with a first cutter edge having an edge portion disposed at an acute angle relative to said central axis for forming a generally frusto-conical portion on an end of a piece of pipe such that such frusto-conical portion converges toward an end of said pipe; said cutter tool also having an inwardly directed second cutter edge portion disposed in spaced relation to said first cutter edge portion; said second cutter edge portion adapted to cut a peripheral groove in a pipe concurrently with the cutting of said frusto-conical portion; said cutter tool also having a third cutter edge portion coinciding with one end of said first cutter edge portion; said third cutter edge portion disposed to cut a reduced diameter portion on said peripheral portion of said pipe and disposed between said first and second cutter edge portions.

14. The invention as defined in claim 13, wherein: said cutter tool is also provided with a relief notched portion disposed radially outward in a direction away from said central axis and spaced radially outward drom said second and third cutter edge portions and adapted to clear the periphery of said pipe; said notched portion disposed between said second and third cutter edge portions.

15. The invention as defined in claim 13, wherein: said third cutter edge portion is provided with a transition portion disposed at an angle to said central axis and disposed to form a shoulder on said pipe between said reduced diameter portion and the periphery of said pipe; said transition edge portion disposed between said second and third cutter edge portions.

16. The invention as defined in claim 14, wherein: said third cutter edge portion is provided with a transition portion disposed at an angle to said central axis and disposed to form a shoulder on said pipe between said reduced diameter portion thereon and the periphery of said pipe; said transition edge portion disposed between said second and third cutter edge portion; said transition edge portion of said cutter being adjacent to one end of said release notch portion.

17. The invention as defined in claim 1, wherein: said collar is provided with diametrically operable clamp means adapted to clamp fixedly on the periphery of a pipe; and means rotatably mounting said collar on said frame.

* * * * *